United States Patent [19]

Missan et al.

[11] 4,389,679
[45] Jun. 21, 1983

[54] LANGUAGE INFORMATION SYSTEM

[75] Inventors: Richard S. Missan, 301 E. 78th St., New York, N.Y. 10021; Leslie M. Orloff, Huntington, N.Y.

[73] Assignee: Richard S. Missan, New York, N.Y.

[21] Appl. No.: 218,769

[22] Filed: Dec. 22, 1980

Related U.S. Application Data

[63] Continuation of Ser. No. 23,409, Mar. 23, 1979, which is a continuation of Ser. No. 772,843, Feb. 28, 1977.

[51] Int. Cl.³ .......................... G11B 5/00; G11B 15/18
[52] U.S. Cl. ........................................ 360/12; 360/72.1
[58] Field of Search ...................... 360/6, 12, 71, 72.1; 340/19 A, 147 C, 152 R; 365/29

[56] References Cited

U.S. PATENT DOCUMENTS

| | | | |
|---|---|---|---|
| 2,911,482 | 11/1959 | Dostert | 35/35 C |
| 2,928,186 | 3/1960 | Hirsch | 35/35 C |
| 3,078,348 | 2/1963 | McIntosh | 35/8 A |
| 3,217,428 | 11/1965 | Spaulding | 360/12 |
| 3,623,242 | 11/1971 | Hoover | 360/12 |
| 3,637,940 | 1/1972 | Morchond et al. | 179/15 |
| 3,755,818 | 8/1973 | Greenspan | 360/12 |
| 3,798,672 | 3/1974 | Gregg, Jr. | 360/12 |
| 3,805,056 | 4/1974 | Birkin | 360/12 |
| 3,960,254 | 6/1976 | Fial et al. | 360/12 |

*Primary Examiner*—Vincent P. Canney
*Attorney, Agent, or Firm*—Darby & Darby

[57] ABSTRACT

A language information system in which a patron in a given location, such as at a play, on a train, or bus, or in a hotel room, is provided with information, or a running commentary, or summary of an event taking place in a language of his choice. In a preferred embodiment of the invention, the patron can select any one of a number of languages which are pre-recorded on a magnetic tape. The starting and stopping of the tape is cued by action taking place during the event.

17 Claims, 4 Drawing Figures

LANGUAGE INFORMATION SYSTEM

This application is a continuation of my copending application Ser. No. 023,409 filed Mar. 23, 1979 which in turn was a continuation of my then copending application, Ser. No. 772,843, filed Feb. 28, 1977.

This invention relates to the conveying of information and, more particularly, conveying information to a person in his native language when he is in a foreign country. In particular, information in a person's native language is to be conveyed to him regarding an event that is taking place. In a typical example, a visitor from a foreign country will come to the United States and attend one or more activities which are taking place in the English language. The foreign visitor, who has little or no knowledge of the English language, will therefore not be able to derive the full benefit of the event. A prime example of this is a play taking place in a Broadway theatre. There, the foreign visitor will not be able to derive the full enjoyment of either the spoken word and, in some cases, will not be able to understand the various types of actions that are taking place and the meanings of these actions.

The present invention relates to an information system for providing a visitor who is not familiar with the English (or some other) language with information in his native language corresponding to a given event which is taking place. In accordance with the invention, the information the person is to receive in his native language is pre-recorded on a suitable storage medium, such as a magnetic tape. The person, for example a theatre patron, is able to select a particular track of information, which is in his native language, from the magnetic tape for reproduction. The tape is controlled so that the information recorded thereon is conveyed to the patron to provide a more or less running commentary or translation of the spoken activity which is taking place.

In a preferred embodiment of the invention, a theatre patron is provided with a console having a switching arrangement whereby he can select the desired track of a magnetic tape to pick out the language that he wants. In addition, the console is provided with other sources of information, such as, for example, information from other pre-recorded tracks, or music, or business information from radio stations.

In the preferred embodiment of the invention, an interactive quiz game is also provided wherein the console is coupled to a computer and the patron is to answer a series of questions with a check on the answers being provided by the computer on a display at the console.

It is therefore an object of the present invention to provide an information system.

A further object is to provide an information system capable of providing a patron with a running commentary or translation of an event in his native language.

An additional object is to provide an information system having both visual and aural readouts.

Another object is to provide an interactive quiz game.

A further object is to provide an information system in which a patron can selectively obtain information from a number of sources as he desires.

Other objects and advantages of the present invention will become more apparent upon reference to the following specification and annexed drawings, in which.

In accordance with one aspect of the invention, a running translation or running commentary of a theatrical production is made as a theatre patron conversant in one language watches the production which is given in another language, e.g. English. The terms "translation" is here used to mean a more or less literal translation of the words spoken by the actors taking place on a more or less simultaneous basis as they are spoken. The term "commentary" means a summary or explanation of the words spoken or sung by the actors and/or the action taking place.

The simplest way to accomplish a running translation or commentary in a "live" situation is to have a translator(s) or commentator available. This is done, for example, at the United Nations where in a typical case a number of translators will simultaneously translate a speech given into a number of different languages. While such an arrangement is effective, it is quite expensive and requires that a staff of trained translators be on call at all times to provide translations of different speeches.

A less complicated problem is encountered where a translation is to be provided on a repetitive basis to accommodate a recurring event. For example, in the case of touring an art museum, cassette tapes are provided in a variety of languages. The patron rents a tape player in the language of his choice and carries it around with him. Normally, the patron controls the starting and stopping of the tape as he goes from one gallery or room to another. He is provided with a commentary of the various objects or paintings within the gallery or room under his own control.

Another similar example is in the case of a film dubbed in one or more languages. Here, a film originally made in one language is dubbed into another language by a set of actors and actresses. The film is then played in the language into which it was dubbed.

The case of providing a running translation or commentary for a theatrical production is different from any of the foregoing in several aspects. First of all, the action is live and there are changes from time to time of the spoken word, i.e. lines are dropped or changed. Further, the timing of the delivery of the lines varies to account for laughter, applause, etc.

Figure 1:
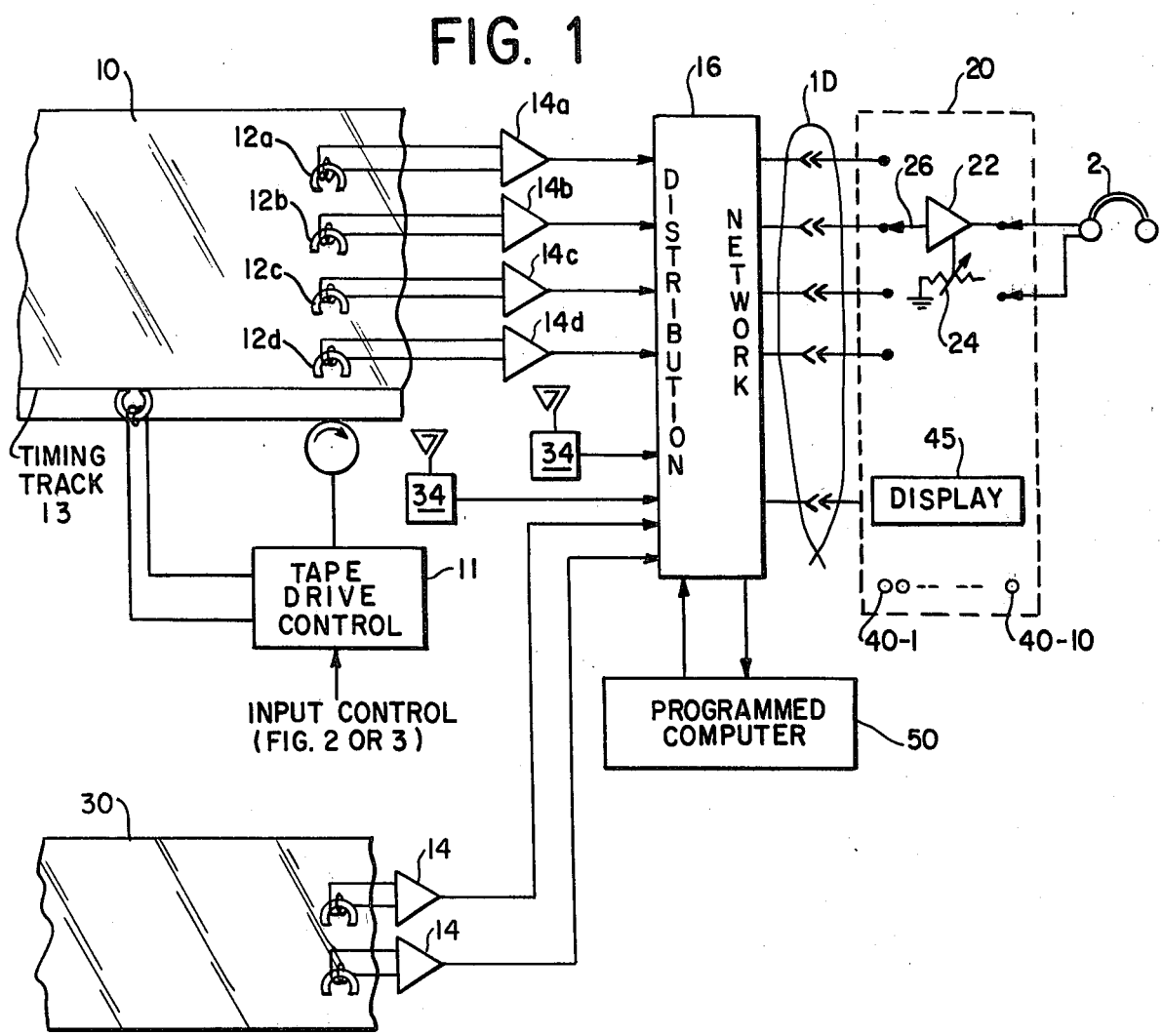
FIG. 1 is a general block diagram of a system according to the invention.

FIG. 1 shows one embodiment of the invention for use in providing a running translation or commentary to a play. A suitable record medium, such as a multi-track magnetic tape 10 is provided. The tape 10 illustrated is shown as having four tracks and a reproducing head 12a, 12b, 12c and 12d associated with each track. Each track has recorded thereon the translation or commentary of the event in a different language. For example, the track associated with head 12a is in Japanese, the track with 12b in French, 12c in German, and 12d in Spanish. There can be as many tracks as desired on the tape to accommodate a variety of languages.

The output of each reproducing head 12 is connected to a respective amplifier 14. Included in each amplifier block 14 are the necessary stages of pre-amplification, amplification, equalization, etc., as is well known to those skilled in the art. Thus, the output of each head 12 is suitably amplified and applied to a distribution network 16. The distribution network 16 is needed since a number of patrons are to be provided with a control console for selecting a desired track of information and other information, to be described below. Consequently, the distribution network 16 comprises the necessary distribution lines, amplifiers, pre-amplifiers, filters and other components needed to distribute the information from tape 10 and other sources to a plurality of consoles.

A plurality of transmission lines 18 branch out from the distribution network to the location for the various consoles to be used by the patrons. In a preferred embodiment of the invention, the consoles are located on the arm of a theatre seat or under the seat to be pulled out for use. Preferably, a plug and jack arrangement is used so that the input lead to the console, illustratively designated 20, can be plugged into the distribution network. Suitable provisions (not shown) are made to prevent the console from being removed without authorization. This can include, for example, an alarm system.

As many consoles 20 as needed are provided for use with the system. Only one is described here in detail. Each console includes an amplifier 22 with a volume control 24, the latter being accessible to the patron. The input to the amplifier 22 is controlled by a switch 26 also under the control of the patron who can select which of the tracks of information from tape 10 to be heard. That is, the patron can select the appropriate line from the distribution network which has the language that he desires. Thus, as the tape moves he is provided with a running translation or commentary of the play in the language of his choice. The patron hears the recorded information over a pair of headphones or an earphone 27 which are plugged into the console 20. Headphones are preferred instead of a loudspeaker so that the sound from the console of one patron will not disturb another patron.

The control of the tape to synchronize with the action taking place on the stage, by the tape drive control mechanism 11, is described below.

The console 20 is also preferably adapted to operate as an information output and exchange device so that the patron will have access to various information inputs and outputs at various times to keep him entertained, for example, before the play starts or during an intermission. For this purpose, there can be, for example, one or more tracks of recorded music or commentary from a recorded tape 30. The information provided from tape 30 can be music, weather, business, stock market reports, etc. These tracks can be selected by the patron by operating switch 26.

Also available to the patron is the information from one or more radio receivers 34 which are tuned to various stations, for example, music, news, business reports, etc. The signal received from each station is suitably amplified and processed and supplied to the distribution network 16. From these it is available to each patron at his console for selection by manipulation of switch 26, which can be a number of pushbuttons. Thus, the patron can also hear information from a radio station as he desires.

To provide further entertainment for the patron, the console 20 is provided with an interactive quiz game. This operates as follows. Each patron is given a sheet with a number of questions. The questions can be printed in a variety of languages and can be of general or special interest. For example, in the case where the console is used in a theatre, the quiz questions would pertain to the theatre, movies, etc.

In accordance with the invention, the quiz aspect is accomplished by an interactive computer system and a display on each console. The sheet of quiz questions given to the patron has a number for each question. There are a plurality of switches for example 8 or 10, or more, which are numbered 40-1 ... 40-10 on the console. The switches correspond to the numbers for the questions. The console also incorporates a display 45. Any suitable display can be used, for example, a cathode ray tube, LCD or LED display. An LED type display with scanning capability is preferred, that is, a display in which the letters can move across the display.

Each console 20 operating with the system is connected to a programmed computer 50 through the distribution network 16. The computer is programmed with the answers to the quiz questions and it outputs this information on demand. For simplicity, the output is on a serial basis. The patron plays the quiz game by reviewing one of the questions on the paper given to him, mentally gives an answer, and then actuates the proper switch 40 corresponding to the question number. This connects the console with the computer 50 and the computer will give the answer to the question. The data from the computer is read out for the question and conveyed to the display 45 on the console. It moves across the display letter by letter or number by number as the case may be. The necessary timing, output, storage and buffer circuits are contained in the computer. The computer 50 can be of the time sharing type so that a number of consoles can be supplied information.

Considering the tape drive control 11, there are several ways in which this can be actuated to provide the patron with a more or less simultaneous running commentary or translation of the event which is taking place. One of the simplest is to provide an operator who would start and stop the tape. The operator would be conversant with the language in which the event is taking place and he would start and stop the tape, or control its running speed, in a manner which would make it more or less simultaneous with the action occurring in the event.

Figure 2:
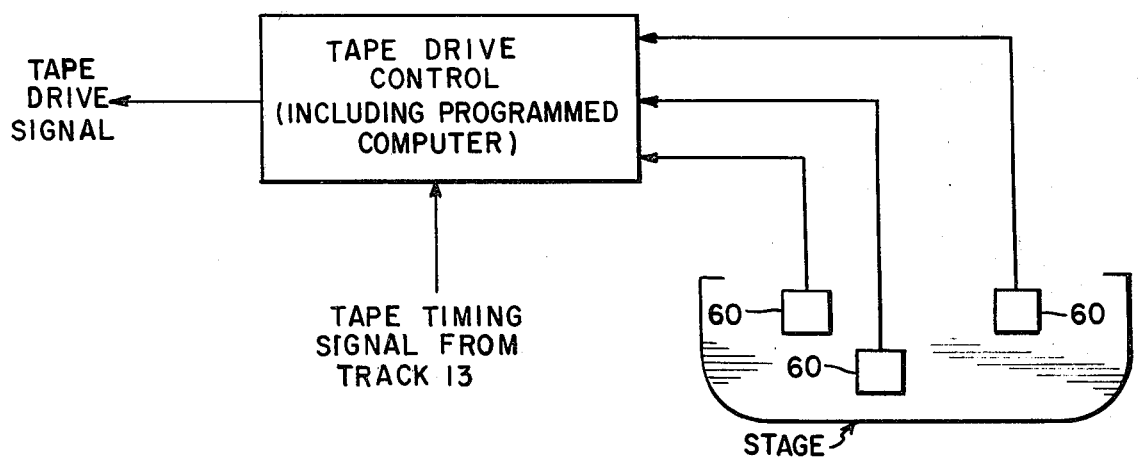
FIG. 2 is a schematic diagram showing one form of cueing system for controlling the output of the storage information medium.

Of course, the provision of an operator gives rise to additional expense. Therefore, it is preferred that some arrangement be provided for automatically starting and stopping the tape. FIG. 2 shows one such an arrangement in which the starting and stopping of the tape by the tape drive control takes place by cues which the actors on the stage normally perform during the course of the play. The cuing system of FIG. 2 uses various entrances and exits of the actors and actresses and/or movements to predetermined places. In this arrangement, for example, detectors are provided at certain points both on an offstage to sense the position or change of position of the actors. A number of detectors 60 are shown in FIG. 2 at various locations on and/or at the stage entrance(s). These detectors can be of any suitable type, for example, light responsive detectors, that is, the actor or actress would break a photocell as he or she crossed a predetermined point in the stage. Detector 60 also can be a radio, ultrasonic, or other wave energy receiver. In the case of a radio or ultrasonic receiver used as a detector, the actor or actress would carry a small transmitter which he or she could activate at the appropriate time in the course of the action to provide the cue or which will produce a signal at all times and will cause a detector to respond when the action is within a predetermined radius and/or area of the detector. This can be accomplished by making the transmitter and/or receiver antennas directional. In either case, the cue is picked up by the detector and a cuing signal is produced. The cuing signal is then provided to the tape drive control 11. The transmitter of each of the actors produces a different signal which is recognized by the receiver and the receiver produce a corresponding unique output signal.

Tape drive control 11 has an input signal the signal from a timing track 13 on the tape 10. The timing track can, for example, produce a number of counting pulses as the tape moves.

Tape drive control 11 also includes a pre-programmed system, formed by a mechanical switch or a computer with a suitable program, so that as a particular cue is received, the tape will be run for a predetermined time and then be stopped. The program is entered into the computer part of the tape-drive control ahead of time since the action which is going to take place is already known. Thus, for example, a cuing signal produced by a given actor from a given detector 60 is recognized by the computer and its program. This program then actuates the tape drive control 11 via the computer to cause it to move a predetermined amount. This can be determined either by the counting pulses from timing track 13 or by the computer itself. In this manner, the tape is kept in step with the action taking place.

A preferred form of cuing for use for controlling the starting and stopping of the tape is under the control of the light system used in the theatre. As is conventional in any theatrical production, a house electrician or lighting technician operates the various spotlights, flood lights, stage lights, etc. The electrician is provided with a script of the play containing a number of lighting cues. The house electrician adjusts lighting cues in accordance with the action taking place on a stage. The lighting cues fairly accurately track the action taking place on the stage. For example, if a song is to be performed by a solo singer, a spotlight might be brought up, a lighting color changed, etc. Lights are also moved to follow an actor, colors are changed to set different moods, and the lighting intensity is changed. Any one or combination of these factors can be used to actuate the tape drive control 11.

Figure 3:
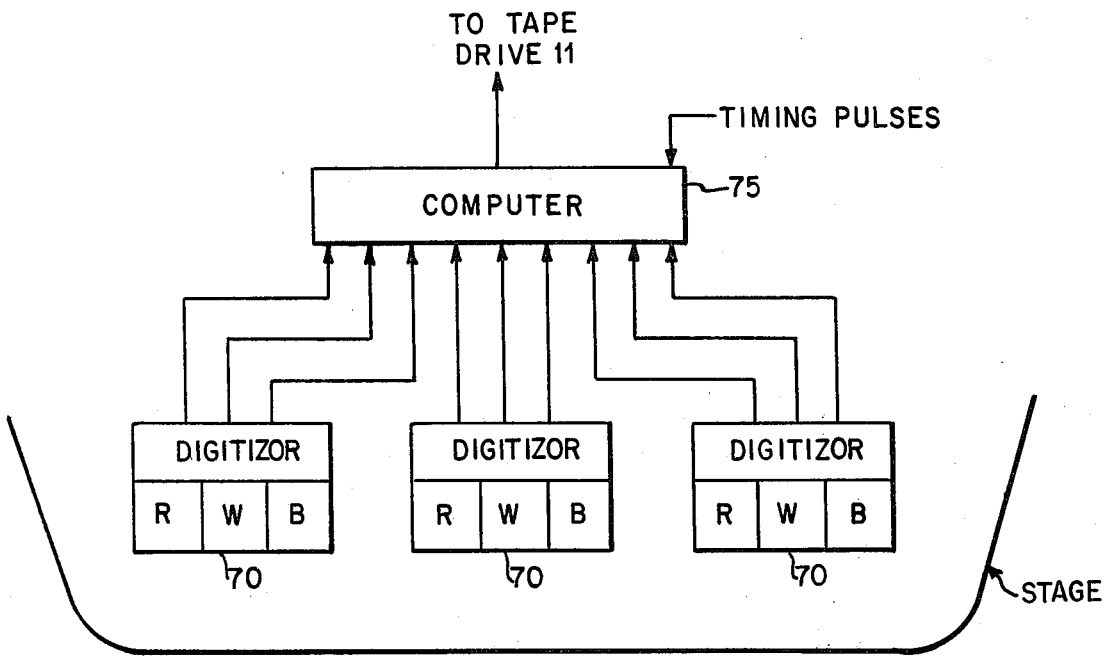
FIG. 3 is a partial schematic diagram of another embodiment of a cuing arrangement for controlling the storage medium.

FIG. 3 shows an embodiment of the invention wherein a number of light detectors are provided to pick up lighting changes brought about by the house electrician changing the lighting during the course of the play. In the preferred embodiment of the invention, a number of light detectors 70 are provided. The detectors 70 are preferably spaced to sense various types of lighting which are normally used during the play, for example, spotlight, flood light, and also, if desired, special cuing type lights can be provided. The latter are not absolutely necessary.

Each of the detectors 70 is of the type which can recognize both the color and the intensity of the light. Color sensing is accomplished, for example, by a number of filters or photocell detectors responsive to a particular spectrum of color. The detectors also respond to the intensity level of the light. It is preferred that at least three colors be sensed, these being white, blue and red. Consequently, each detector 70 is shown as having three output lines for the white, blue and red colors. Appearing on each of the output lines is a signal corresponding to the intensity of the particular color being sensed by the respective detector. The output of each detector 70 is digitized by an analog-to-digital converter located in the detector or at a remote location so that the signal appearing on the output line is a binary word which can be readily processed by a computer.

The outputs of the detectors 70 are applied to a computer 75 where they are matched with a stored instructional program. That is, the outputs of the detectors are applied to the computer as one or more binary words. The word(s) is checked against another word(s) in memory, with the words in memory being read out on a sequential basis corresponding to the action taking place in the script. That is, the computer program is written to recognize the action which is to take place and it knows that a certain combination or sequence of lighting cues as sensed by the detector corresponds to a certain point in the action of the play.

When the word(s) is recognized by the computer, either an exact match or a match within a reasonable degree of error being needed as determined by the program, the computer puts out a signal which actuates the tape-drive control 11 to drive the tape for a predetermined amount of time. The time can be determined by the counting pulses, from track 13 or from a self-contained turning signal put out by the computer. In this manner the translation or commentary is kept in step with the action taking place on the stage.

Utilizing the principles of the subject invention, it is also possible to provide a patron who is not conversant with the English language with information at other places. For example, the console 20 and its associated system components can be adapted for use in buses, trains and other vehicles.

Figure 4:
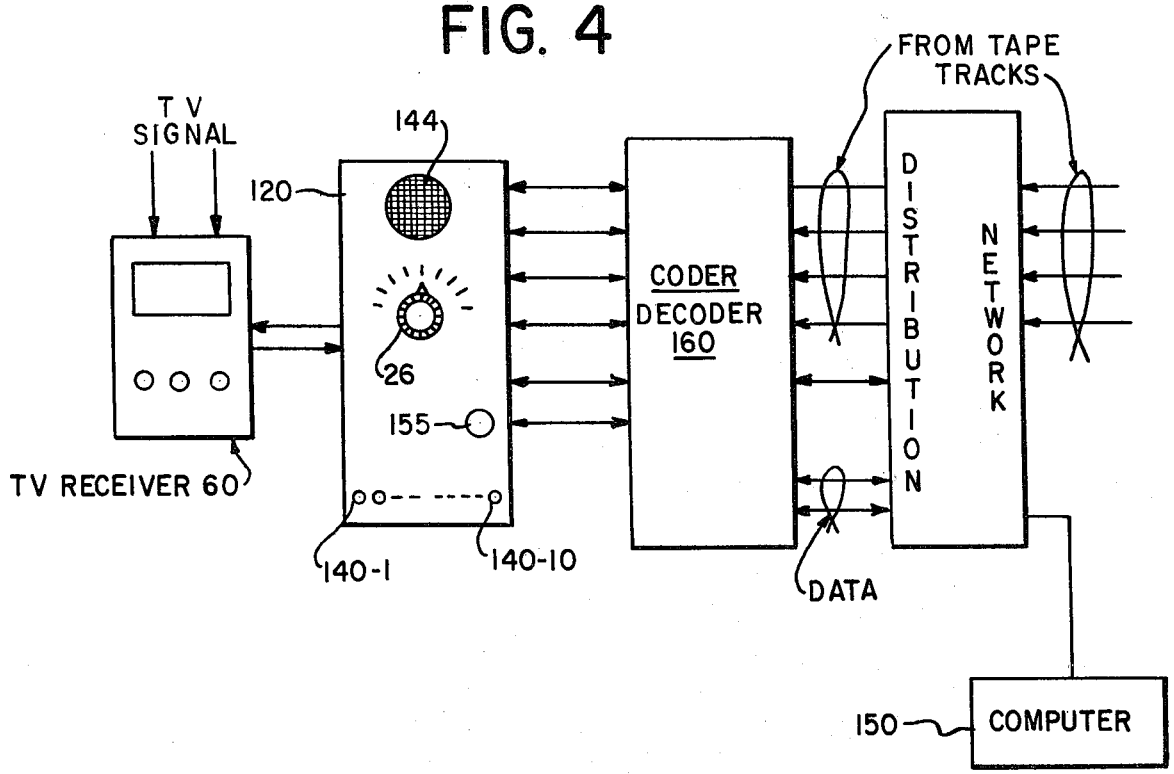
FIG. 4 is a schematic diagram of an embodiment of the invention for use in a hotel or motel.

A further and more pertinent use is when the patron returns to his hotel or motel room at night. In this arrangement, a system is provided utilizing a console system of the type disclosed with respect to FIG. 1 wherein the sound track of movies shown on the television receiver in the patron's hotel room or other information can be provided to him. FIG. 4 shows a schematic block diagram of such a system. Here, the usual television receiver present in the hotel room is designated by reference numeral 80. Interconnected with the television receiver 60 is a control console 120 which has many features similar to that of a control console 20 of FIG. 1. Here, the control console 120 connnected through a distribution network 116 to a central information source located in the hotel in which, for example, the sound track of the movie which is being shown on the hotel television receiver is recorded on a tape, such as tape 30, on a number of tracks. A patron desiring to view a movie, which is shown by the hotel on a more or less continuous basis, switches the T.V. receiver to the channel for the movie and turns down the sound of the T.V. receiver. At the same time, he operates the selector switch 26 on his control console 120 to receive the sound from the movie in the desired language. In this case, instead of having the earphones shown in FIG. 1, a speaker 144 is preferably provided on the control console and there is also a volume control. The system also can be wired to reproduce the sound through the T.V. receiver.

The record medium with the movie sound track in the various languages, or magnetic tape, is synchronized by starting the tape at the same time as the movie.

Alternatively, a number of sound tracks in the different languages can be recorded directly on the film.

The application of the subject invention in connection with movies also can be used in a movie theatre. That is, the patron is provided with a control console at his seat, selects the appropriate language track and watches the movie while listening in the preferred language. An earphone or headphone is preferably used in this application.

The interactive portion of the system of FIG. 4 operates in a different manner rather than providing the answer to game quizzes. Here, instead of providing answers to quizzes, the hotel patron is supplied with a sheet which lists several categories of information available to the patron in his native language from a computer, for example, the location of various ethnic restaurants, location of medical facilities, current sporting events available, etc. The sheet listing these various categories is printed in a number of languages and made available to the hotel patron.

By pressing one of the buttons 140-1 through 140-10, as many being provided as needed, this requests information. For example, pressing button 140-1 corresponds to a request for information regarding the location of restaurants in the vicinity of the hotel.

In the system of FIG. 4, the control console 120 is linked with a computer 150 through network 116. Here, the computer is programmed with the information to be responsive to the questions which are selected by the patron from the buttons 140 on the control console 120. In this case, the combination of the language track selected by the patron by the switch 26 and the category of information by the button 140 actuates the computer 150 to give the information. The computer 135 is pre-programmed with the information of the various categories is a number of languages.

The computer 150 is actuated by the combination of the switches 140 and 26 and by the patron pushing a switch 155 asking for a data display. Console 120 contains a data transmission set which sends out digital signals to the computer regarding the information to be requested. The computer 150 outputs the information with which it was originally programmed, that is, the information to a category request in the requested language. The television receiver 60 is used as a video display terminal. That is, the information outputted by the computer 150 is displayed on the television receiver 60 in the language selected.

It is also preferred that the receiver in each room be provided with suitable addressing circuitry so that the information requested by the room and transmitted by the computer will be unique to that room. This can be done, for example, by providing an address coder/decoder 160. When the data display request switch 155 is activated, the request for information by the console 120 is preceded by an address produced by the coder portion of unit 160 in digital form. The computer recognizes this address and retransmits it back through the distribution network 116 to the coder/decoder 160 which opens to pass the subsequent information from the computer. Decoder 160 will only open in response to receiving the correct address in digital form. In this manner, the information from the computer will be received only by the room requesting it. It should be understood, of course, that the coder/decoder of each room has a unique address.

So that many patrons can use the computer 150 at the same time, the computer can be operated on a time-sharing basis. Also, it is possible to provide the video display monitor, the television receiver 60, with a storage capability. That is, the television receiver is operated to display the information received for a predetermined time and then to erase this information.

The system and control console 20 of FIG. 1 also can be adapted to display information other than the answers to quiz questions. That is, information of the type referred to in connection with the system of FIG. 6 also can be displayed on the display 45 of console 20 of FIG. 1.

What is claimed is:

1. An information system for explaining an event which occurs in a number of portions each of a predetermined time period comprising:
a storage medium having a plurality of tracks of audio information pre-recorded thereon in different languages in segments corresponding to the portions of the event, said event occurring external to the pre-recorded information,
means for reading the information from each track of the plurality of tracks,
means for selecting the track whose audio information is to be reproduced, means for aurally reproducing the audio information of the selected track,
and means responsive to selected occurrences of the event external of the pre-recorded information for synchronizing the reproduction of the pre-recorded information from all of the tracks of the storage medium in segments each of which corresponds with a particular portion of the event taking place.

2. An information system as in claim 1 wherein said synchronizing means comprises means for moving said storage means relative to said reproducing means, and means for controlling said moving means.

3. An information system as in claim 1 wherein said event is a stage presentation having at least one live performer, said means responsive to said selected occurrences comprising means for detecting selected movements of the performer to predetermined locations for producing a signal for application to said controlling means.

4. An information system as in claim 3 wherein the performer carries a transmitter of wave signal energy and a said detector is responsive to the reception of the wave signal energy.

5. An information system as in claim 3 wherein said detector means comprises optical means responsive to the physical movement of a performer adjacent to a said detector.

6. An information system as in claim 1 wherein said event is a stage presentation including lighting means, the condition of which is varied from an external source at predetermined times during the event, said means responsive to said selected occurrences comprising means for detecting a lighting condition and producing a data signal corresponding thereto, and means responsive to said data signal for actuating said controlling means for said moving means.

7. An information system as in claim 6 wherein said light condition detector means comprises means responsive to the intensity of the light.

8. An information system as in claim 6 wherein said light condition detector means comprise means responsive to the color of the light.

9. An information system as in claim 6 wherein said means responsive to said data signal comprises programmed computer means preprogrammed to recognize a said data signal corresponding to a lighting condition.

10. An information system as in claim 1 further comprising means for producing at least one other source of information which is unrelated to said event, said means for selectively and aurally reproducing said information from a track also being capable of selecting and aurally reproducing a said other source of information.

11. An information system for explaining an event which occurs in a number of portions each of a predetermined time period comprising:

a storage medium having a plurality of tracks of audio information pre-recorded thereon in different languages in segments corresponding to the portions of the event, said event occurring external to the pre-recorded information, means for reading the information from each track of the plurality of tracks, means for selecting the track whose audio information is to be reproduced, means for aurally reproducing the audio information of the selected track, means responsive to selected occurrences of the event external of the pre-recorded information for synchronizing the reproduction of the pre-recorded information from all of the tracks of the storage medium in segments each of which corresponds with a particular portion of the event taking place, display means and pre-programmed computer means coupled to said display means including storage means programmed with a plurality of units of information, means for conveying the stored programmed information from said computer means to said display means for displaying thereon, and means for selecting a said unit of information to be displayed on said display means.

12. An information system as in claim 11 further comprising control console means, said display means and said means for selecting the track of information to be reproduced being housed in said control console.

13. An information system as in claim 11 in combination with a printed document, the printed document having thereon a listing of the units of information stored by the computer means.

14. An information system as in claim 14 wherein the listing of units of information on said document comprises a sequential listing of a number of questions, the stored unit of information corresponding to the answer to the question.

15. An information system as in claim 13 wherein the listing of units of information on said document comprises a sequential listing of a number of categories of information in a plurality of languages, a stored unit of information corresponding to the information in a respective category in a particular language.

16. An information system as in claim 11 wherein said display means comprises a television receiver adapted to receive and display available television programming.

17. An information system as in claim 16 further comprising a control console, said means for selecting the track of information to be aurally reproduced and said means for selecting a stored unit of information housed in said control console.

* * * * *